(12) United States Patent
Gald et al.

(10) Patent No.: US 12,038,040 B2
(45) Date of Patent: Jul. 16, 2024

(54) HINGE WITH INTERNAL ON-AXIS ROTATIONAL STOP AND SHEARING MECHANISMS

(71) Applicant: Raytheon Company, Tewksbury, MA (US)

(72) Inventors: Matthew Gald, Tucson, AZ (US); Stephen J. Forgacs, Tucson, AZ (US); Dan L. Reller, Vail, AZ (US); Dean J. Cornelius, Tucson, AZ (US)

(73) Assignee: Raytheon Company, Tewksbury, MA (US)

( * ) Notice: Subject to any disclaimer, the term of this patent is extended or adjusted under 35 U.S.C. 154(b) by 366 days.

(21) Appl. No.: 17/348,371

(22) Filed: Jun. 15, 2021

(65) Prior Publication Data

US 2022/0397150 A1 Dec. 15, 2022

(51) Int. Cl.
| | |
|---|---|
| *F16C 11/10* | (2006.01) |
| *F16C 11/04* | (2006.01) |
| *F16C 11/12* | (2006.01) |
| *F42B 15/36* | (2006.01) |

(52) U.S. Cl.
CPC ............ *F16C 11/10* (2013.01); *F16C 11/045* (2013.01); *F16C 11/12* (2013.01); *F42B 15/36* (2013.01); *Y10T 403/32591* (2015.01)

(58) Field of Classification Search
CPC ....... F16C 11/045; F16C 11/10; F16C 11/103; F16C 11/12; F42B 10/46; F42B 15/34; F42B 15/36; Y10T 403/11; Y10T 403/32549; Y10T 403/32557; Y10T 403/32591

USPC ...................... 403/2, 112, 113, 117; 244/121
See application file for complete search history.

(56) References Cited

U.S. PATENT DOCUMENTS

| | | | | |
|---|---|---|---|---|
| 3,188,685 A | | 6/1965 | Fletcher | |
| 3,397,903 A | * | 8/1968 | Archdale | .................. A61F 2/64 |
| | | | | 403/113 |
| 3,706,281 A | | 12/1972 | Hatakeyama | |
| 4,874,145 A | | 10/1989 | Prentice | |
| 5,265,969 A | * | 11/1993 | Chuang | ................... F16C 11/10 |
| | | | | 403/103 |

(Continued)

FOREIGN PATENT DOCUMENTS

| | | | |
|---|---|---|---|
| CH | 662503 A5 * | 10/1987 | .............. F16C 11/10 |
| CN | 208933479 U | 6/2019 | |

(Continued)

OTHER PUBLICATIONS

"International Application Serial No. PCT/US2022/029632, International Search Report dated Aug. 8, 2022", 4 pgs.

(Continued)

*Primary Examiner* — Josh Skroupa
(74) *Attorney, Agent, or Firm* — Schwegman Lundberg & Woessner, P.A.

(57) ABSTRACT

A hinge includes internal on-axis stopping mechanisms that cause the hinge to shear and break at an on-axis weakened region of the hinge when rotation of the hinge reaches a predetermined angle with a specified torsional load. The on-axis configuration is compact, has minimal impact on the outer mold line (OML) of the object to which it is mounted both pre and post detachment and allows for accurate tailoring of the torsional load that will detach the hinge.

20 Claims, 10 Drawing Sheets

(56) References Cited

U.S. PATENT DOCUMENTS

| | | | |
|---|---|---|---|
| 6,244,779 B1 * | 6/2001 | Slasinski | F16C 11/10 |
| | | | 403/110 |
| 6,679,453 B2 | 1/2004 | Steiner | |
| 7,037,287 B2 | 5/2006 | Cormier et al. | |
| 8,333,151 B2 | 12/2012 | Krisher | |
| 8,461,501 B2 | 6/2013 | Williams et al. | |
| 8,519,312 B1 | 8/2013 | Merems | |
| 2006/0169841 A1 | 8/2006 | Dulat et al. | |
| 2006/0175154 A1 * | 8/2006 | Lin | F16C 11/103 |
| | | | 188/67 |
| 2020/0003253 A1 * | 1/2020 | Ng | F16C 11/045 |

FOREIGN PATENT DOCUMENTS

| | | | | |
|---|---|---|---|---|
| DE | 1147807 B * | 4/1963 | | F16C 11/10 |
| DE | 3511991 A1 * | 1/1986 | | F16C 11/103 |
| DE | 102010054567 A1 * | 6/2012 | | F16C 11/045 |
| FR | 1206819 A * | 2/1960 | | F16C 11/10 |
| GB | 576683 A * | 1/1934 | | F42B 10/46 |
| WO | WO-2017113496 A1 * | 7/2017 | | F16C 11/10 |
| WO | WO-2022265787 A1 | 12/2022 | | |

OTHER PUBLICATIONS

"International Application Serial No. PCT/US2022/029632, Written Opinion dated Aug. 8, 2022", 5 pgs.

"International Application Serial No. PCT/US2022/029632, International Preliminary Report on Patentability dated Dec. 28, 2023", 7 pgs.

* cited by examiner

HINGE WITH INTERNAL ON-AXIS ROTATIONAL STOP AND SHEARING MECHANISMS

GOVERNMENT LICENSE RIGHTS

This invention was made with government support under HR0011-17-C-0025 awarded by the United States Department of Defense. The government has certain rights in this invention.

BACKGROUND OF THE INVENTION

Field of the Invention

This invention relates to hinges, and more particularly to hinges whose angle of rotation is limited and at which point the hinge shears and breaks detaching the solid object attached to one side of the hinge. Such hinges may, for example, be used for the controlled deployment and detachment of a cover on an aerodynamic body such as a missile, rocket, artillery shell, airplane, unmanned aerial vehicle (UAV) or drone or space based system or other moving or stationary bodies or for the controlled detachment of any solid object so attached.

DESCRIPTION OF THE RELATED ART

Hinges may be defined as a mechanical bearing that connects two solid objects, typically allowing only a limited angle of rotation between them. Two objects connected by an ideal hinge rotate relative to each other about a fixed axis of rotation, all other translations or rotations being prevented, and thus a hinge has one degree of freedom. The angle of rotation is typically limited by an external stop that impedes the rotation of one of the solid objects, the other solid object typically being fixed.

Certain aerodynamic bodies include elements such as optical windows or domes, air inlets etc. that need to be protected prior to flight, at launch or for some portion of flight before the elements are operational. A cover may be secured to the aerodynamic body to protect the element. At launch or later in flight, the cover is released. These systems typically use the aerodynamic forces caused by airflow into the body that produces forces radially outward on the cover to deploy and release the cover. In some cases, this occurs immediately after launch. In other cases, a mechanism secures the cover until it is released allowing the airflow to deploy the cover.

U.S. Pat. No. 6,679,453 entitled "Jettisonable Protective Element" discloses a number of embodiments in which a detachable hinge is configured to control the deployment of a cover from an aerodynamic body. As shown in FIG. 3 and described at col. 7, line 60 to col. 8, line 8, the hinge 26 can be of an asymmetric ball in socket configuration. When the cover rotates to a predetermined angle, the ball element frees from the socket, thus enabling spontaneous disassembly of the hinge and detachment of the cover. Such a ball and socket hinge may have reliability issues related to either thermal heating, corrosion or manufacturing tolerances. Furthermore, the socket remains after detachment and may create localized hot spots or disturbances of the boundary layer of airflow over the aerodynamic body. As shown in FIGS. 4a-4e and described at col. 8, lines 10 to 41, another embodiment of a hinge breaks at a structurally weakened region formed in the cover when the cover strikes a stoppage element positioned on the aerodynamic body. As shown in FIG. 5 and described at col. 8, line 62 to col. 9, line 2, another embodiment of a hinge breaks at shearable pin along the rotation axis of the hinge when the cover strikes the stoppage element positioned on the aerodynamic body. The stoppage elements that limit the angle of rotation are positioned external to the hinge and offset from the axis of rotation. The load is transferred into cantilevered bending and dumped into the structurally weakened region (e.g., the slit of shearable pin) to shear off the cover. This places the breakage point in the primary flow path of an air-breathing system such as a turbine, RAM or SCRAM jet resulting in risk of damage to critical components from a Foreign Object Debris (FOD) perspective. Furthermore, the configuration of the stoppage elements increases the effective size of the detachable hinge and affects the outer mold line (OML) of the aerodynamic body, both before and after detachment of the cover.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a hinge in which internal on-axis stopping mechanisms cause the hinge to shear and break at an on-axis weakened region of the hinge when rotation of the hinge reaches a predetermined angle with a specified torsional load. The on-axis configuration is compact, has minimal impact on the OML of the object to which it is mounted both pre and post detachment and allows for accurate tailoring of the load that will detach the hinge.

A hinge comprises first and second hinge plates configured for attachment to first and second solid objects, respectively. An on-axis member extends from the first hinge plate along an axis of rotation into a thru hole in the second hinge plate. A force exerted on the second solid object rotates the second solid object around the axis of rotation. The on-axis member includes a stopping feature and a weakened region positioned between the first hinge plate and the stopping feature. The second hinge plate includes a complementary stopping feature configured in the thru hole to engage the on-axis member's stopping feature at a predetermined angle of rotation to produce a torsional load on the on-axis member that creates torsional shear of the on-axis member at the weakened region to detach the hinge and remove the second solid object from the first solid object.

The weakened region may, for example, constitute a smaller diameter region of the member, a slit or aperture formed in the member or with varying material properties.

In different embodiments, the second solid object may be a cover that is permanently detached to uncover a previously covered area. In certain embodiments, the covered area may include a protected element within the first solid object. For example, aerodynamic bodies such as missiles, rockets, guided artillery shells, UAVs, drones, manned aircraft or spacecraft may include protected elements such as optical sensing systems, air inlets or the like that must be protected in flight until those elements are operational.

In an airborne platform, a cover is reversibly secured to an aerodynamic body to protect a protected element from an external environment. A releasing mechanism (e.g., a pyrotechnic or piston actuator) is provided for at least partially detaching the cover from the aerodynamic body. A securing assembly secures the cover to the aerodynamic body. The securing assembly includes the hinge for connecting a first end of the cover to a first region of the aerodynamic body with a releasable element (e.g., tension screws, bands or other mechanically connected element) securing a second end of the cover to a second region of the aerodynamic body. The hinge is configured such that when the second end of the cover separates from the second region of the aerodynamic body in flight, a force (e.g., airflow or as provided by the releasing mechanism) exerted on the cover rotates the cover about an axis of rotation to engage the hinge's internal complementary stopping features at a predetermined angle thereby producing a torsional load that shears the hinge at the on-axis weakened region to release the cover. The hinge is compact and provides minimal impact on the OML of the aerodynamic body either pre or post-detachment.

The hinge may be designed in different ways reflecting varying degrees of integration of its component elements and with the solid objects to which it is attached. Different configurations may be selected and possibly combined depending upon the application.

In one configuration, the stopping feature is a discrete component fastened to the end of the on-axis member (e.g. via a fastener). The hinge includes a load transfer interface (e.g., a plurality of shear pins or a splined interface) that couples the stopping feature to the on-axis member to transfer the torsional load created by the engagement of the stopping features to the on-axis member to shear the on-axis member at the weakened region. The discrete component may include a full diameter region equal to the diameter of the thru hole in rotational engagement with the thru hole at the load transfer interface. The on-axis member may include an integrally formed full diameter region, adjacent the weakened region, which is coupled to the full diameter region of the discrete component via the load transfer interface.

In another configuration, at least one or both of the first and second hinge plates are integrally formed with the first and second solid objects, respectively. At least the weakened region of the on-axis member may be integrally formed with the first hinge plate and first solid object. The entire on-axis member may be integrally formed with the first hinge plate and first solid object.

In another configuration, the on-axis member is integrally formed to include the weakened region and the stopping feature. In this case, the torsional load created by the engagement of the complementary stopping features is applied directly to the weakened region.

In another configuration, the on-axis member, integrally formed or discretely joined, may include a full diameter region equal to the diameter of the thru hole in rotational engagement with the thru hole. In one case, the stopping feature is offset axially from the full diameter region to engage the complementary stopping feature. In another case, the stopping feature is formed in the full diameter region to engage the complementary stopping feature.

These and other features and advantages of the invention will be apparent to those skilled in the art from the following detailed description of preferred embodiments, taken together with the accompanying drawings, in which:

DETAILED DESCRIPTION OF THE INVENTION

Figure 1A:
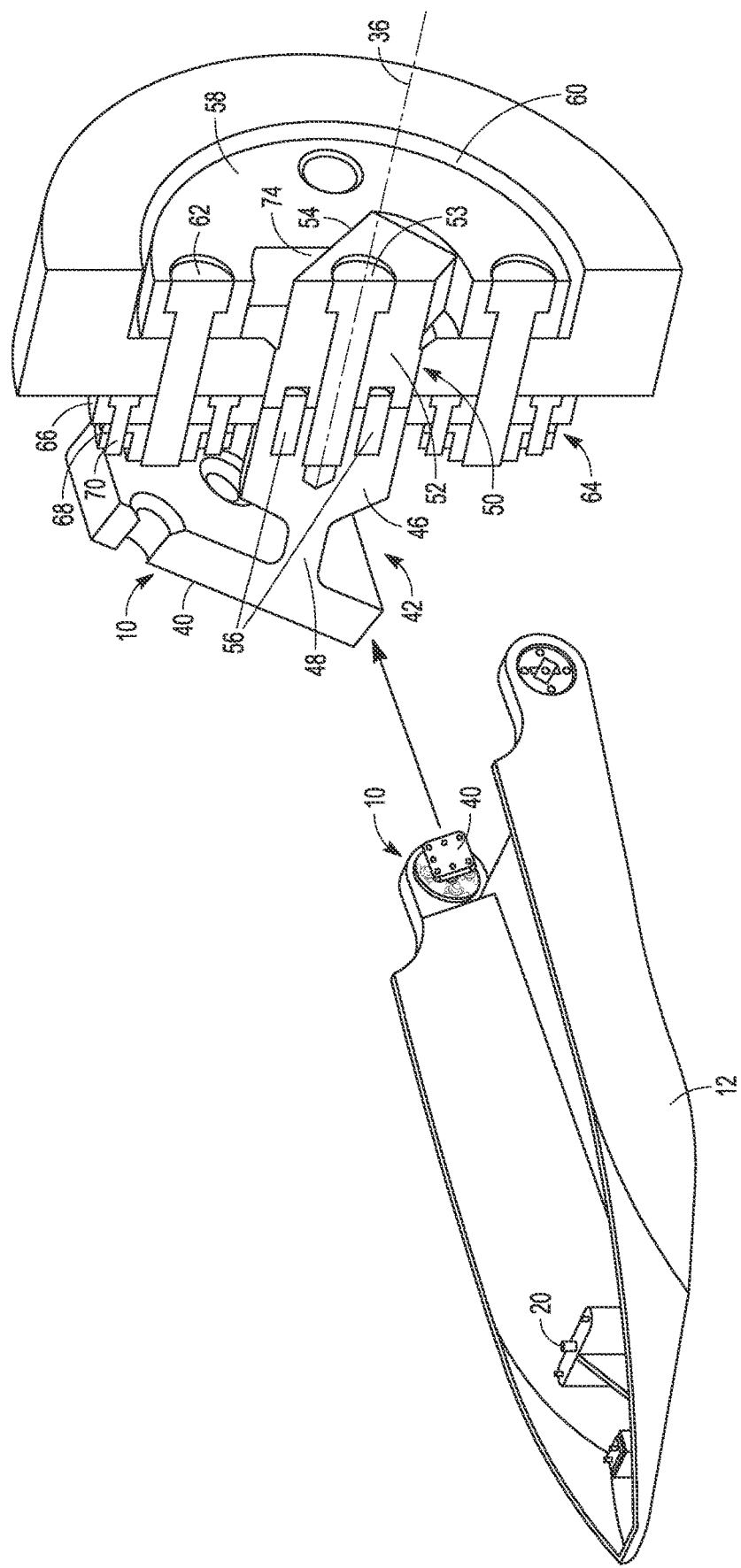
FIGS. 1A and 1B are drawings of an embodiment of a hinge with on-axis rotational stop and shearing mechanisms for controllable detachment of a cover from an aerodynamic body.
Figure 1B:
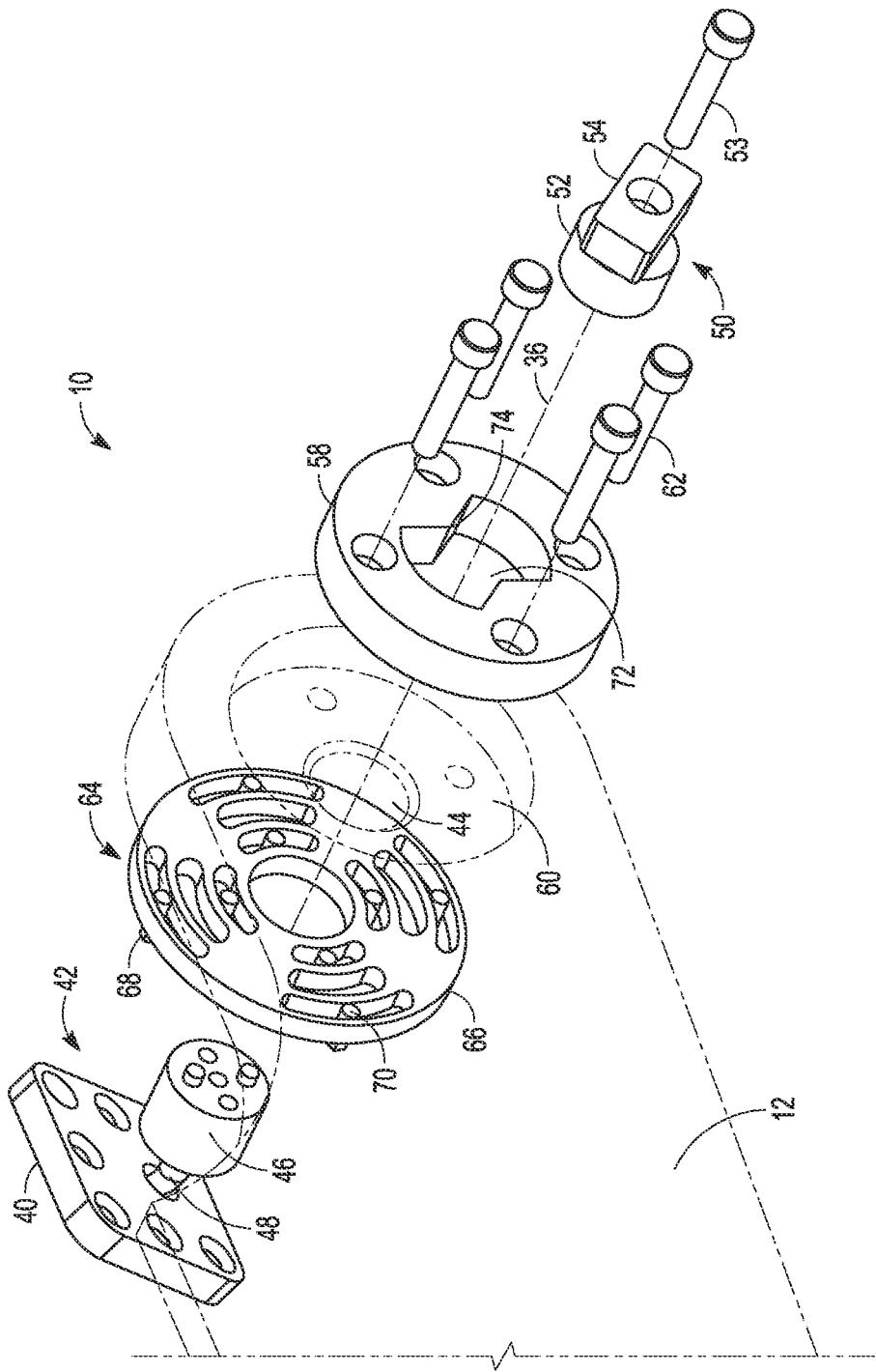

The present invention provides a hinge in which internal on-axis stopping mechanisms cause the hinge to shear and break at an on-axis weakened region of the hinge when rotation of the hinge reaches a predetermined angle with a specified torsional load. The on-axis configuration is compact, has minimal impact on the OML of the object to which it is mounted both pre and post detachment and allows for accurate tailoring of the load that will detach the hinge.

Although generally desirably in most applications, these features are of particular importance to aerodynamic bodies such as missiles that travel at very high speeds. Space on or in an aerodynamic body of this type is at a premium. The on-axis configuration of the hinge is very compact, its footprint being only that of the hinge components that support rotation of the cover. Because the aerodynamic body travels at high speeds its OML is carefully designed for aerodynamics, to limit local thermal effects and disruption of the boundary layer of airflow over the body. Because all aspects of the hinge are internal, the hinge itself creates minimal impact on the OML either pre or post-detachment of the cover. Furthermore, the on-axis hinge design limits FOD in the primary flow path of an air-breathing system if used to cover an air intake, for example.

A hinge comprises first and second hinge plates configured for attachment to first and second solid objects, respectively. An on-axis member extends from the first hinge plate along an axis of rotation into a thru hole in the second hinge plate. A force exerted on the second solid object rotates the second solid object around the axis of rotation. The on-axis member includes a stopping feature and a weakened region positioned between the first hinge plate and the stopping feature. The second hinge plate includes a complementary stopping feature configured in the thru hole to engage the on-axis member's stopping feature at a predetermined angle of rotation to produce a torsional load on the on-axis member that creates torsional shear of the on-axis member at the weakened region to detach the hinge and remove the second solid object from the first solid object. The weakened region may, for example, constitute a smaller diameter region of the member, a slit or aperture formed in the member or varying material properties.

In different embodiments, the second solid object may be a cover that is permanently detached to uncover a previously covered area. In certain embodiments, the covered area may include a protected element within the first solid object. For example, aerodynamic bodies such as missiles, rockets, guided artillery shells, UAVs, drones, manned aircraft or spacecraft may include protected elements such as optical sensing systems, air inlets or the like that must be protected in flight until those elements are operational.

In an airborne platform, a cover is reversibly secured to an aerodynamic body to protect a protected element from an external environment. A releasing mechanism (e.g., a pyrotechnic or piston actuator for controlled release or spring-loaded or airflow for release at launch) is provided for at least partially detaching the cover from the aerodynamic body. A securing assembly secures the cover to the aerodynamic body. The securing assembly includes the hinge for connecting a first end of the cover to a first region of the aerodynamic body with a releasable element (e.g., tension screws, bands or other mechanically connected element) securing a second end of the cover to a second region of the aerodynamic body. The hinge is configured such that when the second end of the cover separates from the second region of the aerodynamic body in flight, a force (e.g., airflow or as provided by the releasing mechanism) exerted on the cover rotates the cover about an axis of rotation to engage the hinge's internal complementary stopping features at a predetermined angle thereby producing a torsional load that shears the hinge at the on-axis weakened region to release the cover. The hinge is compact and provides minimal impact on the OML of the aerodynamic body either pre or post-detachment.

The hinge may be designed in different ways reflecting varying degrees of integration of its component elements and with the solid objects to which it is attached. Different configurations may be selected and possibly combined depending upon the application. Without loss of generality, a hinge 10 using discrete components to secure and then controllably detach a cover 12 from a missile 14 will be presented with reference to FIGS. 1A-1B, 2A-2C, 3A-3B, 4A-4B and 5A-5B.

Missile 14 includes an aerodynamic body 16, a protected element 18 within the aerodynamic body and cover 12, reversibly secured to the aerodynamic body, for protecting the protected element from an external environment. A releasing mechanism 20 such as a pyrotechnic actuator or a piston actuator is configured to at least partially detach the cover from the aerodynamic body. A securing assembly 22 secures the cover to the aerodynamic body. The securing assembly 22 includes the hinge 10 for connecting a first end 24 of the cover to a first region 26 of the aerodynamic body, and a releasable element 28 such as tension screws, bands or other mechanically connected element securing a second end 30 of the cover to a second region 32 of the aerodynamic body. Hinge 10 is configured such that when the second end 30 of the cover separates from the second region 32 of the aerodynamic body when the missile is in flight, a force 34 exerted on the cover rotates the cover about an axis of rotation 36 before detaching the hinge 10, thereby removing the cover 12 from missile 14. Force 34 may, for example, be provided by the releasing mechanism 20 or by airflow over the aerodynamic body.

In this discrete configuration, hinge 10 includes a first hinge plate 40 attached to the aerodynamic body 16. An on-axis member 42 extends from the first hinge plate 40 along the axis of rotation 36 aligned with a first thru hole 44 in cover 12. The on-axis member includes a full diameter region 46 equal in diameter to the first thru hole 44 in the cover and a reduced diameter weakened region 48 positioned between the first hinge plate and the full diameter region 46. A hard stop 50 includes a full diameter region 52 fastened to the end of the full diameter region 46 of the on-axis member via a fastener 53 and a stopping feature 54. Full diameter region 52 is in rotational engagement with the first thru hole 44 in the cover such that the force 34 rotates the cover around the axis of rotation.

A load transfer interface, shown here as a plurality of shear pins 56, couples the full diameter region 52 of the hard stop 50 to the full diameter region 46 of the on-axis member 42. The interface serves to transfer a torsional load created when the complementary stopping features are engaged to the weakened region of the on-axis member. The cumulative shear strength of the interface, here the plurality of shear pins, must be greater than the shear strength of the weakened region. For example, the weakened region may exhibit a shear of 80 lbf (pound feet) while the pins cumulative strength is 100 lbf. Under more strenuous flight conditions, the weakened region may exhibit a torsional shear of 425 lbf while the pins cumulative strength is 500 lbf. This can be achieved by varying the diameter of the weakened region or by maintaining the same geometry but varying the material properties of the on-axis member versus the hard stop. Note, the fastener 53 that fastens the hard stop to the on-axis member has minimal affect on load transfer, its purpose is to secure the hard stop to the on-axis member.

A second hinge plate 58 is positioned in a recess 60 in cover 12 and attached (clamped) to the cover via fasteners 62 that engage a ring assembly 64 positioned on the inner surface of the cover opposite the second hinge plate. Ring assembly 64 includes a floating nut plate 66 that is attached to a ring 68 via fasteners 70. Second hinge plate 58 has a second thru hole 72 aligned to the first thru hole 44. The second hinge plate has a complementary stopping feature 74 configured in the second thru hole 72 to engage the hard stop's stopping feature 54 at a predetermined angle of rotation to produce moment 76 about the axis of rotation 36 to transfer a torsional load 78 thru the load transfer interface 56 to shear the on-axis member 42 at the reduced diameter weakened region 48 to detach the hinge 10 and remove the cover 12 from the aerodynamic body 16 leaving the first hinge plate 40 and a small proturbance 80 (what remains of the weakened region 48) attached to the aerodynamic body.

Figure 2A:
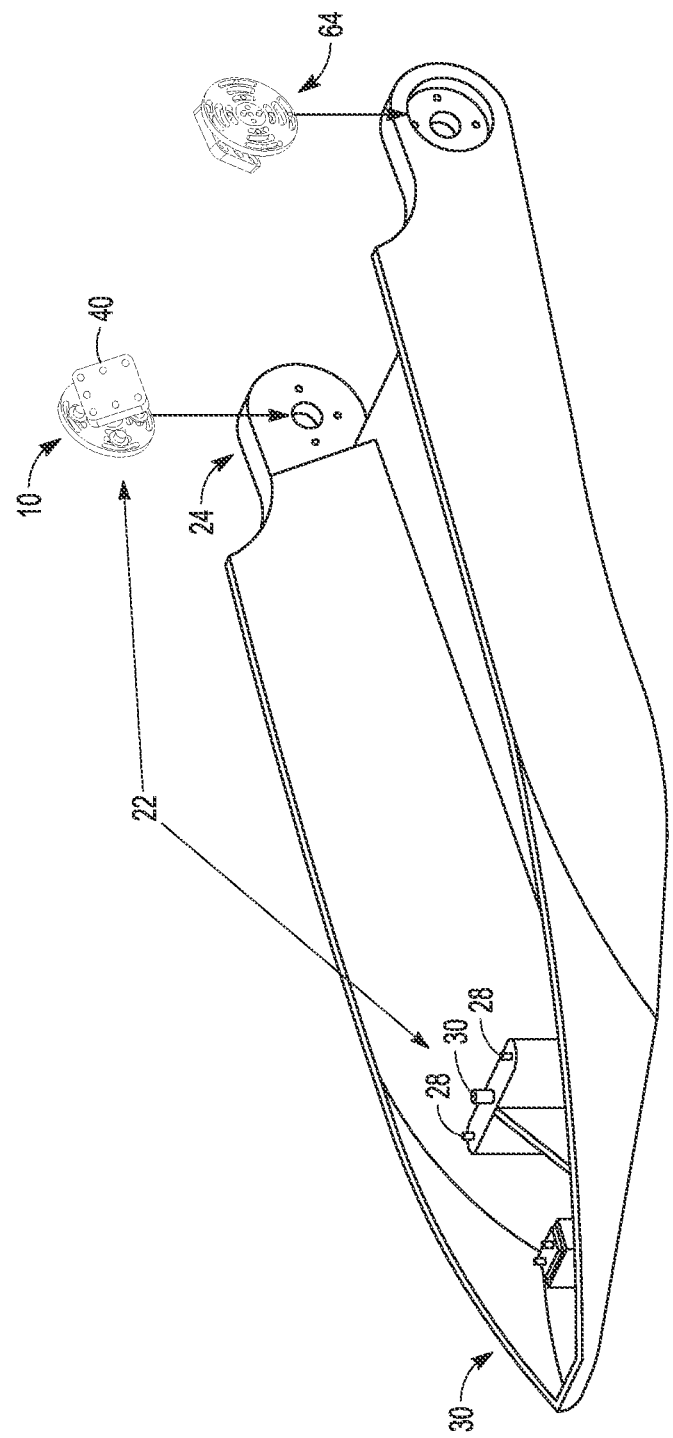
FIGS. 2A through 2C illustrate an embodiment for assembly of the hinge to mount the cover on the aerodynamic body.
Figure 2B:
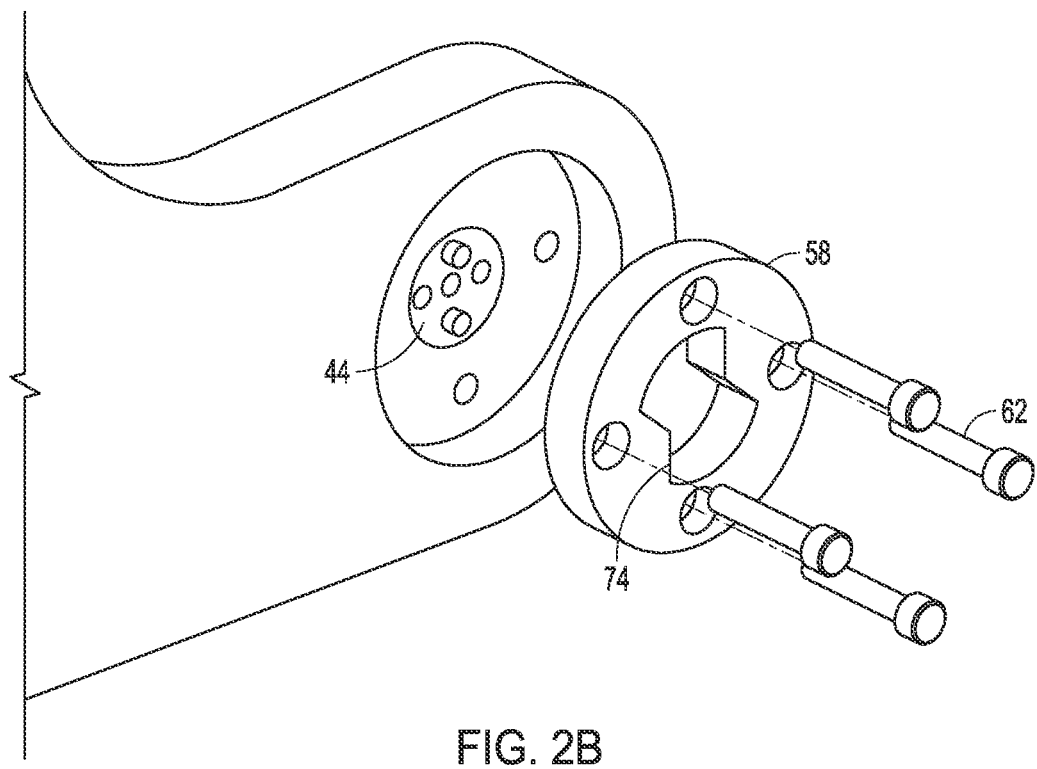
Figure 2C:
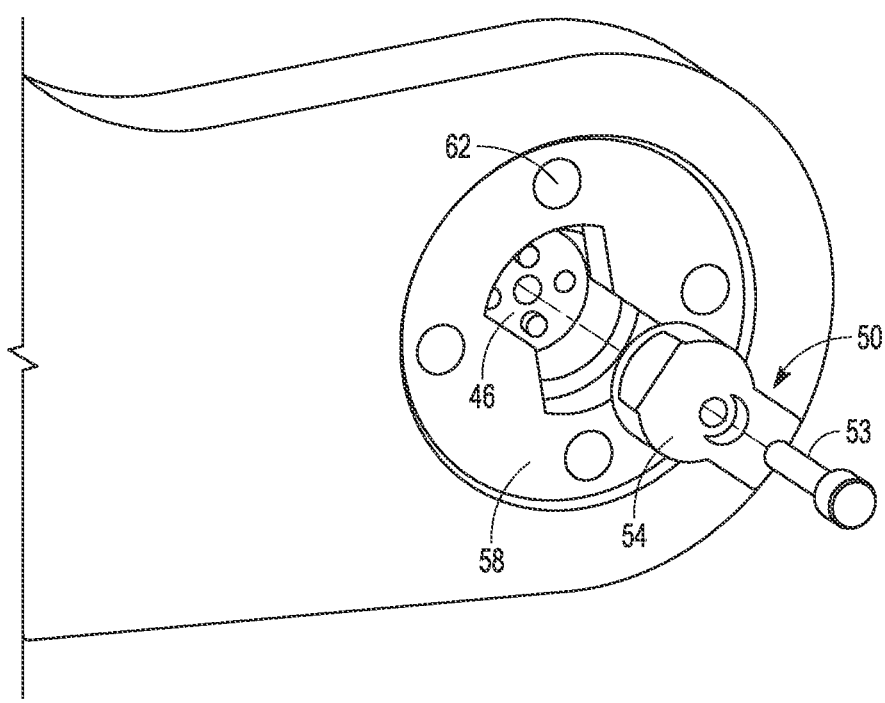

Referring specifically to FIGS. 2A-2C, hinge 10 is assembled to attach cover 12 to aerodynamic body 16 by attaching the first hinge plates 40 to the aerodynamic body. Ring assembly 64 is placed on the on-axis member 42 that extends from the first hinge plates along the axis of rotation. Cover 12 is positioned to align thru hole 44 with the on-axis member 42 and axis of rotation 36 as shown in FIG. 2A. The second hinge plate 58 is placed in recess 60 and fasteners 70 are inserted through the second hinge plate to engage ring assembly 64 to clamp the second hinge plate 58 to cover 12 as shown in FIG. 2B. Lastly, hard stop 50 is coupled to on-axis member 42 via shear pins 56 and fastener 53 between its full diameter region 52 and the on-axis member full diameter region 46 as shown in FIG. 2C.

Figure 3A:
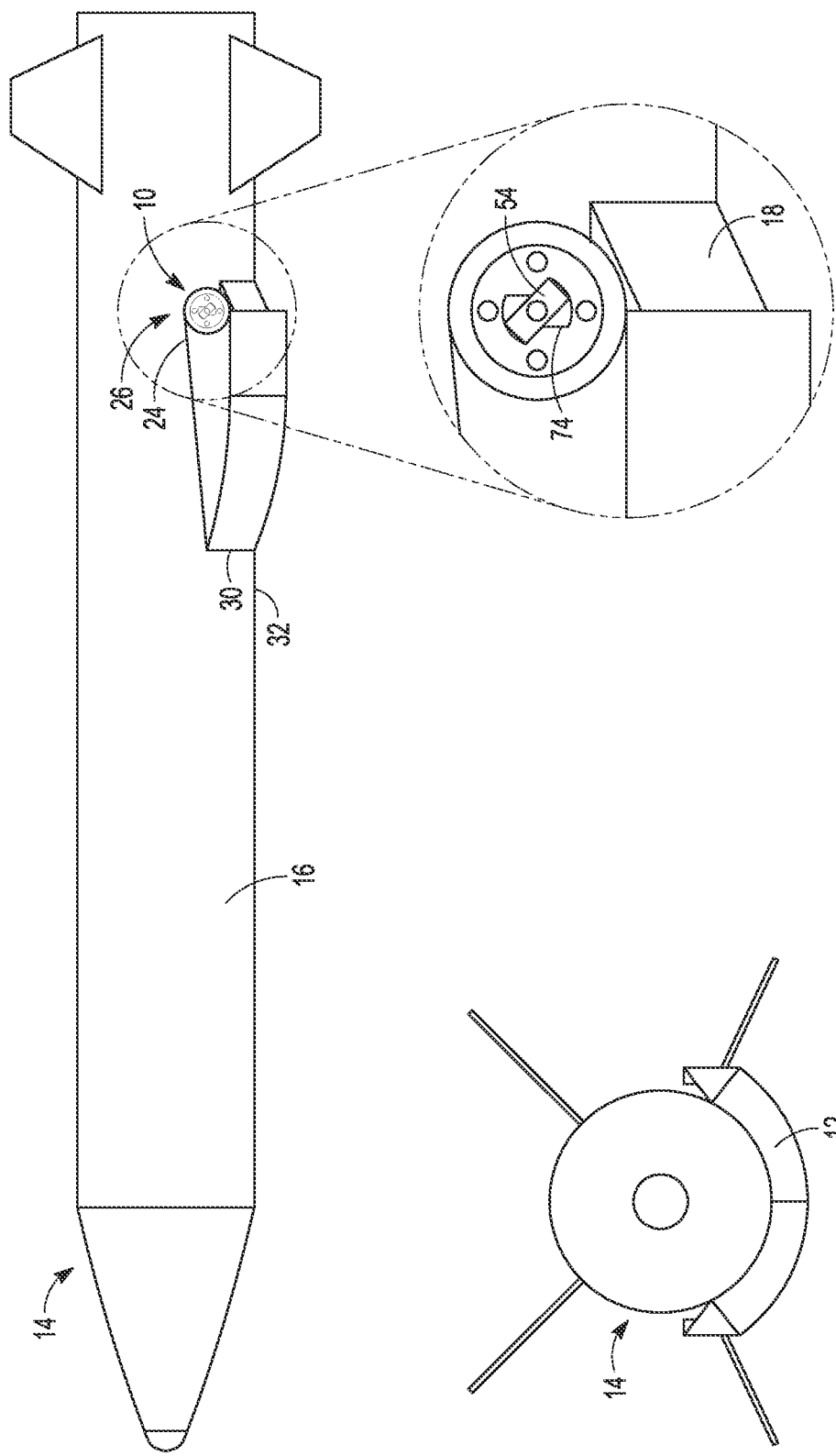
FIGS. 3A-3B, 4A-4B and 5A-5B are perspective and on-axis illustrations of a cover at 0° of rotation, 45° of rotation to the hard stop and detached from the aerodynamic body.
Figure 3B:
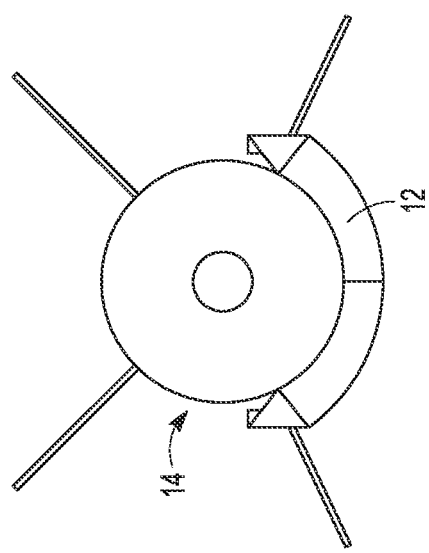
Figures 4A, 4B:
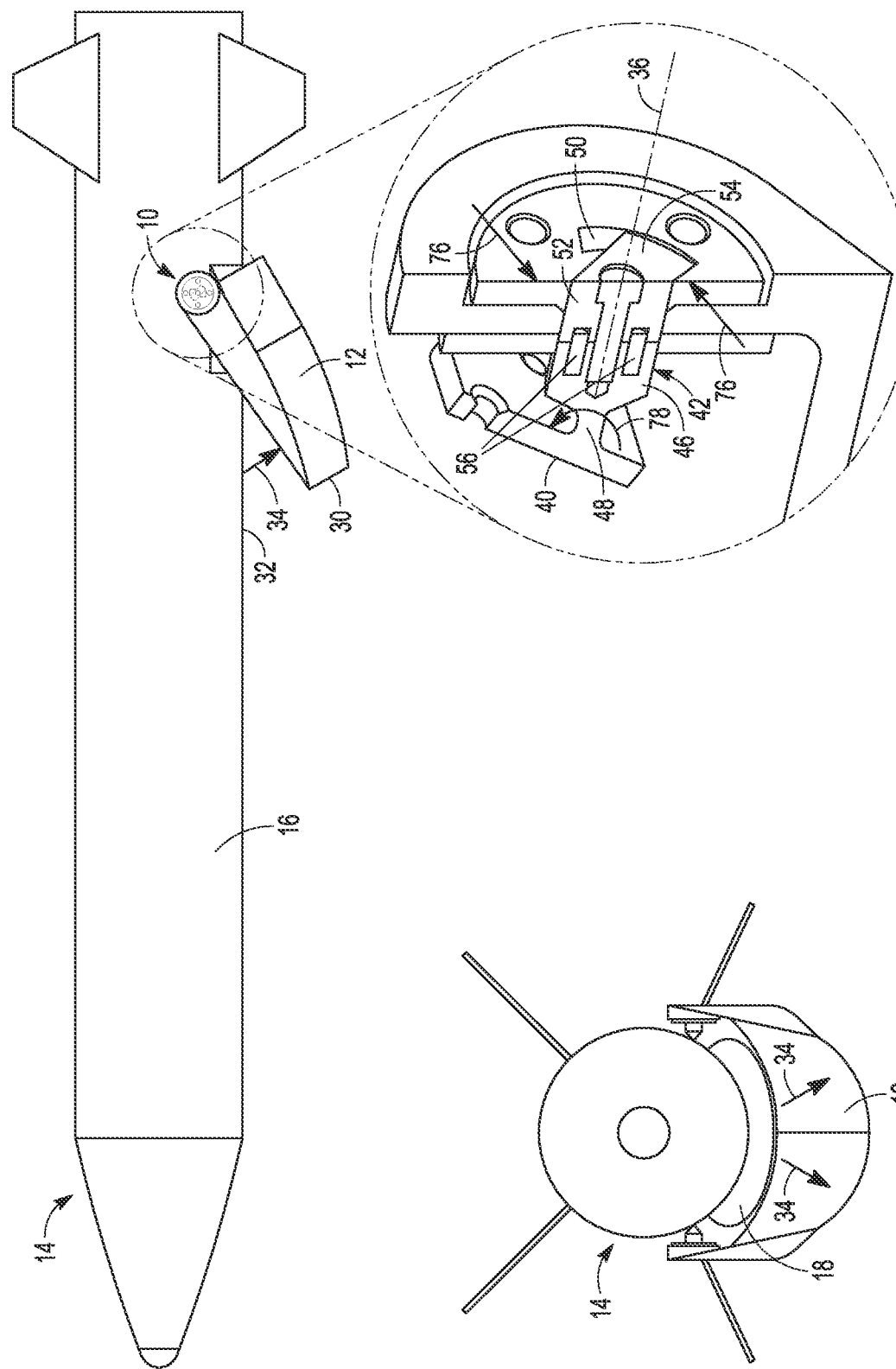
Figures 5A, 5B:
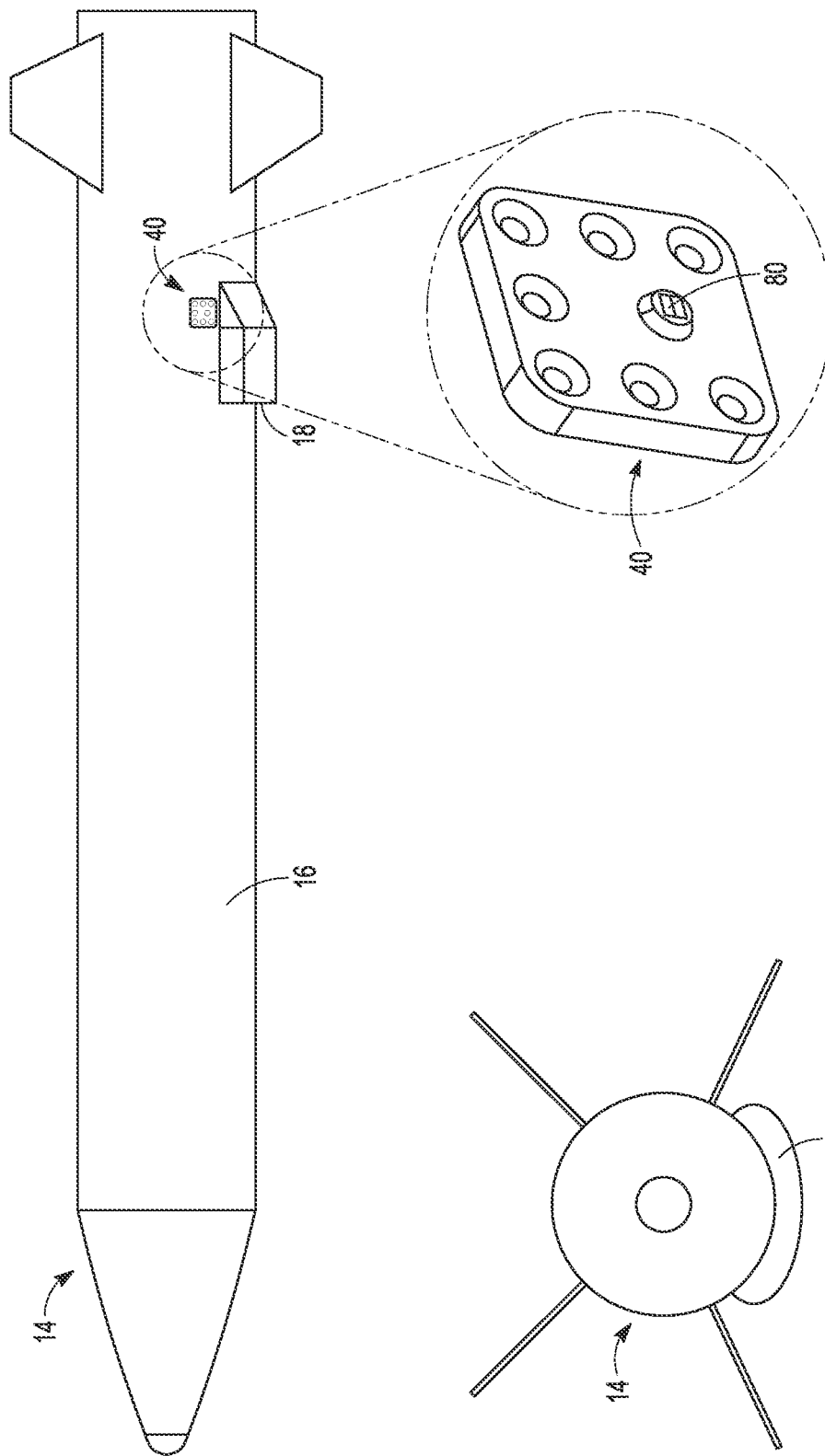

Referring specifically to FIGS. 3A-3B, 4A-4B and 5A-5B, hinge 10 is engaged in flight to controllably release and permanently detach cover 12. As shown in FIGS. 3A-3B, hinge 10 and cover 12 are secured in a closed or stowed position at 0° of rotation. The second end 30 of the cover is secured to the second region 32 of the aerodynamic body 16 to protect the protected element 18 (e.g. an air intake). At 0° of rotation, the cover's complementary stopping feature 74 does not engage the hard stop 50. As shown in FIGS. 4A-4B, the releasing mechanism (pyrotechnic actuator) 20 has separated the releasable elements 28 (tension screws) to partially detach cover 12 from aerodynamic body 16. The airflow over the aerodynamic body produces forces 34 that are exerted on cover 12 causing cover 12 to rotate about axis of rotation 36 to 45° of rotation at which point the cover's complementary stopping feature 74 has engaged the hard stop 50 producing a moment 76 about the axis of rotation, which in turn produces torsional load 78. Shear pins 56 transfer the torsional load 78 to the reduced diameter weakened region 48 of the on off-axis member. As shown in FIGS. 5A-5B, hinge 10 has sheared off at the reduced diameter weakened region 48 leaving only a small proturbance 80 on the first hinge plate 40 attached to aerodynamic body 16.

Figure 6A:
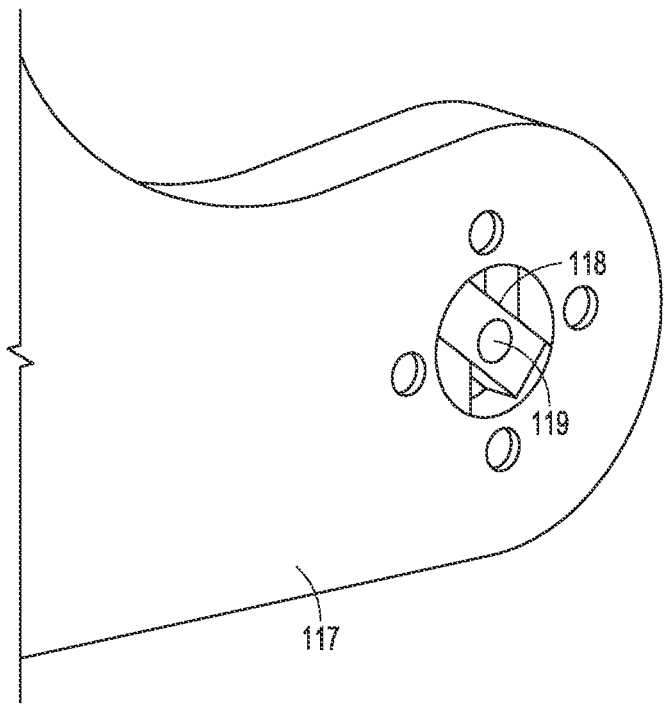
FIGS. 6A and 6B is an illustration of another embodiment of the hinge in which the hinge plates and a portion of the on-axis member are integrally formed with the aerodynamic body and cover.
Figure 6B:
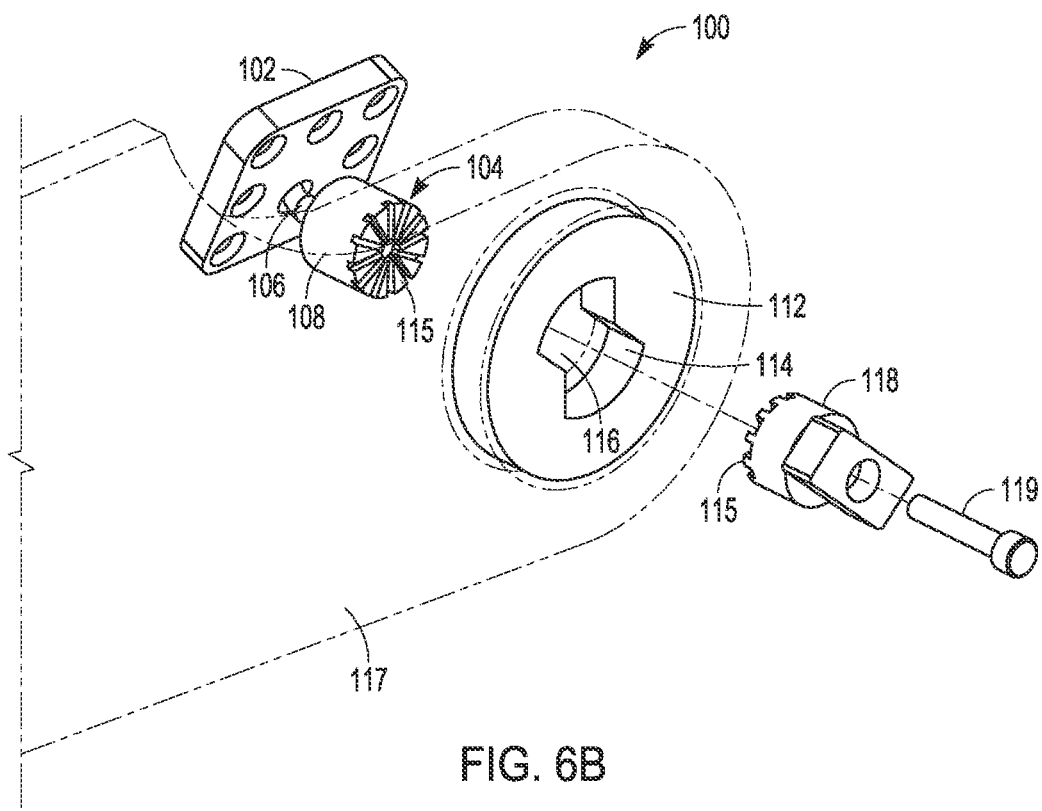

Referring now to FIGS. 6A-6B, in an embodiment of a hinge 100 a first hinge plate 102 and a portion of an on-axis member 104 including a reduced diameter weakened region 106 and a full diameter region 108 are integrally formed with the aerodynamic body and a second hinge plate 112 including a complementary stopping feature 114 is integrally formed in a thru hole 116 in a cover 117. As before, cover 117 is positioned to align thru hole 116 with on-axis member 104 whose full diameter region 108 nearly contacts the inner surface of the cover. A hard stop 118 is attached is attached to on-axis member 104 via fastener 119. In this example, the load transfer interface is implemented with a splined interface 115 formed on the opposing surfaces of the on-axis member 104 and the hard stop 118.

Figure 7:
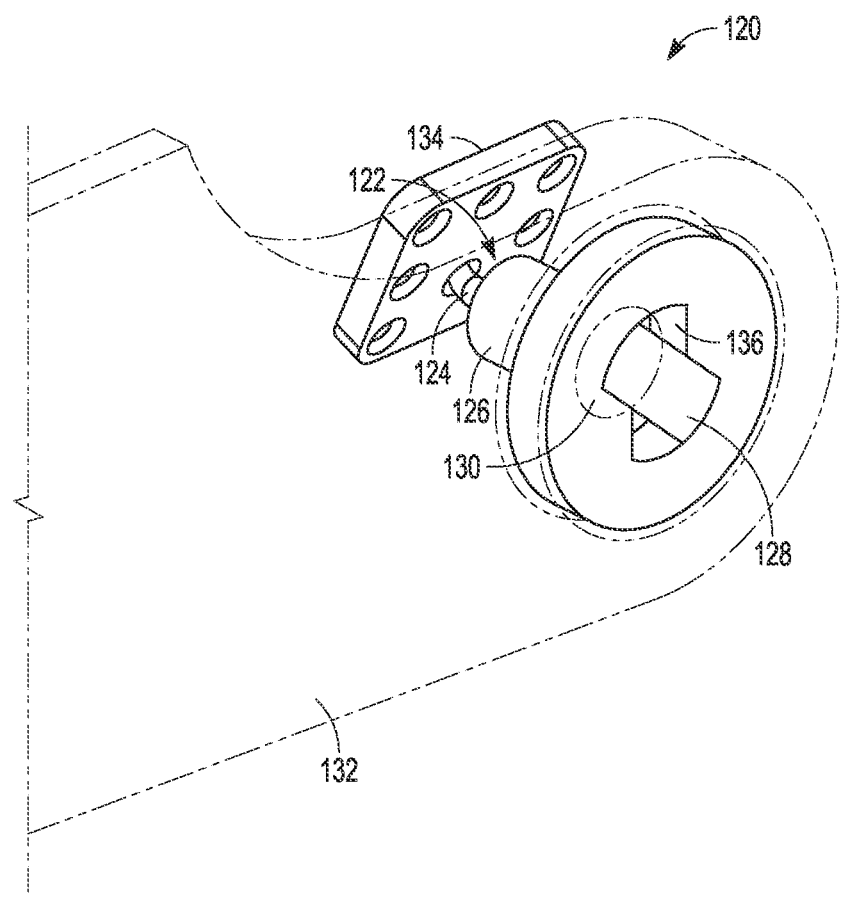
FIG. 7 is an illustration of an integrally formed on-axis member for an embodiment of a hinge.

Referring now to FIG. 7, in an embodiment of a hinge 120, an on-axis member 122 is integrally formed to include a reduced diameter weakened region 124, a full diameter region 126 and a stopping feature 128. In one configuration, a thru hole 130 in a cover 132 is aligned to a mounting feature 134 on the aerodynamic body. The on-axis member 122 is inserted in the through hole to engage mounting feature 134. A complementary stopping feature 136 may be formed either in a hinge plate attached to cover 132 or integrally in thru hole 130 in the cover as shown in the drawing. An integrally formed on-axis member does not require a load transfer interface to transfer the torsional load produced by engagement of the complementary stopping features to the reduced diameter weakened region.

The on-axis hinge includes both a full diameter region in rotational engagement with a thru hole in the cover/hinge plate to provide reliable and stable rotation of the cover about the axis of rotation away from the aerodynamic body and complementary stopping features formed on the on-axis member and in the thru hole that engage at a predetermined angle and shear the hinge to permanently detach the cover. Up to this point, the complementary stopping features are physically offset axially from the full diameter region of the on-axis member and the thru hole and functionally separately. However, the complementary stopping features may be incorporated into the full diameter region of the on-axis member and the thru hole. In so doing, a portion of the 3600 degrees of possible rotational engagement between the full diameter region of the on-axis member and the inner surface of the thru hole must be sacrificed. How much of the 360° degrees must be sacrificed depends both on the predetermined angle of rotation at which the complementary stopping features are engaged and the geometry of those features. This may be implemented in either a discrete configuration in which a hard stop is pinned to the on-axis member or in which the hard stop is integrally formed with the on-axis member.

Figure 8A:
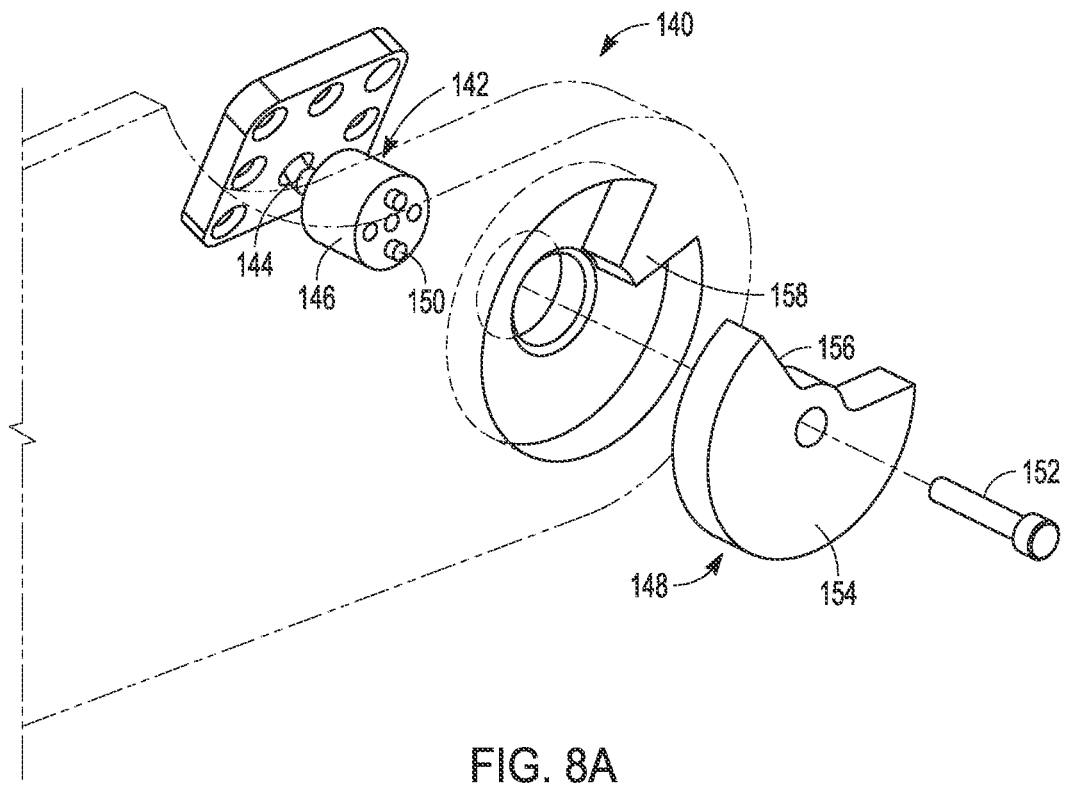
FIGS. 8A and 8B are perspective and end-on views of an on-axis member in which the stopping feature is formed within the full diameter region that engages the thru hole in the cover for rotation about the axis of rotation.
Figure 8B:
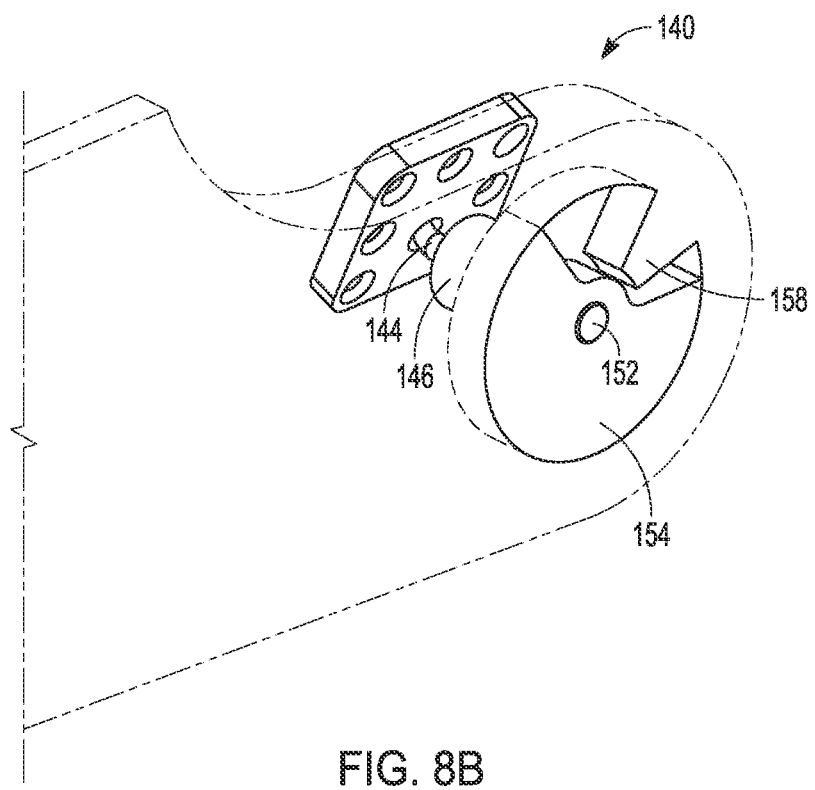

Referring now to FIGS. 8A-8B, in an embodiment of a hinge 140, an on-axis member 142 includes a reduced diameter weakened region 144 and a full diameter region 146. A hard stop 148 is coupled to the on-axis member via shear pins 150 and fastener 152. Hard stop 148 includes a full diameter region 154 in which a quadrant has been removed to form a stopping feature 156. A complementary stopping feature 158 is formed in a wall of a full diameter thru hole 160 to engage stopping feature 156 at a predetermined angle.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A hinge, comprising:
   a first hinge plate configured for attachment to a first solid object;
   an on-axis member that extends from the first hinge plate along an axis of rotation, said on-axis member including a stopping feature and a weakened region positioned between the first hinge plate and the stopping feature; and
   a second hinge plate configured for attachment to a second solid object, said second hinge plate having a thru hole for receiving the on-axis member such that a force exerted on the second solid object rotates the second solid object around the axis of rotation, said second hinge plate having a complementary stopping feature configured in said thru hole to engage the on-axis member's stopping feature at a predetermined angle of rotation to produce a torsional load on the on-axis member that shears the on-axis member at the weakened region to detach the hinge and remove the second solid object from the first solid object.

2. The hinge of claim 1, wherein said stopping feature is a discrete component fastened to an end of the on-axis member, said hinge further comprising a load transfer interface that couples the stopping feature to the on-axis member to transfer the torsional load to shear the on-axis member at the weakened region.

3. The hinge of claim 2, wherein the load transfer interface comprises a plurality of shear pins.

4. The hinge of claim 2, wherein said discrete component includes a full diameter region equal to the diameter of the thru hole in rotational engagement with the thru hole in the second hinge plate at the load transfer interface.

5. The hinge of claim 4, wherein said on-axis member includes an integrally formed full diameter region, adjacent the weakened region, that is coupled to the full diameter region of the discrete component via the load transfer interface.

6. The hinge of claim 1, wherein at least one of the first hinge plate or the second hinge plate is configured to be integrally formed with the first solid object or the second solid object, respectively.

7. The hinge of claim 1, wherein the first hinge plate and at least the weakened region of the on-axis member are configured to be integrally formed with the first solid object.

8. The hinge of claim 1, wherein said on-axis member is integrally formed to include the weakened region and the stopping feature.

9. The hinge of claim 1, wherein said on-axis member includes a full diameter region equal to the diameter of the thru hole in rotational engagement with the thru hole in the second hinge plate.

10. The hinge of claim 9, wherein the stopping feature is offset axial from the full diameter region to engage the complementary stopping feature.

11. The hinge of claim 9, wherein the stopping feature is formed in the full diameter region to engage the complementary stopping feature.

12. A platform comprising:
a body;
a solid object, reversibly secured to said body;
a releasing mechanism for at least partially detaching said solid object from said body; and
a securing assembly for securing said solid object to said body, said securing assembly including a hinge for connecting a first end of said solid object to a first region of said body, and a releasable element securing a second end of said solid object to a second region of said body;
said hinge being configured such that when said second end of said solid object separates from said second region of said body, a force exerted on said solid object rotates the solid object about an axis of rotation before detaching said hinge, thereby removing said solid object from said body; and
wherein said hinge includes
an on-axis member that extends from the body thru a thru hole in the solid object along the axis of rotation such that the force rotates the solid object around the axis of rotation, said on-axis member including a stopping feature positioned within the thru hole in the solid object and a weakened region positioned between the body and the stopping feature; and
a complementary stopping feature configured in the thru hole in the solid object to engage the on-axis member's stopping feature at a predetermined angle of rotation to produce a torsional load on the on-axis member that shears the on-axis member at the weakened region to detach the hinge and remove the solid object from the body.

13. The platform of claim 12, wherein said stopping feature is a discrete component fastened to an end of the on-axis member, said hinge further comprising a load transfer interface that couples the stopping feature to the on-axis member to transfer the torsional load to shear the on-axis member at the weakened region.

14. The platform of claim 13, wherein said stopping feature includes a full diameter region equal to the diameter of the thru hole in rotational engagement with the thru hole in the second hinge plate at the load transfer interface, wherein said on-axis member includes an integrally formed full diameter region, adjacent the weakened region, that is coupled to the full diameter region of the stopping feature via the load transfer interface.

15. The hinge of claim 13, wherein said on-axis member is integrally formed to include the weakened region and the stopping feature.

16. The hinge of claim 13, wherein said on-axis member includes a full diameter region equal to the diameter of the thru hole in rotational engagement with the thru hole in the second hinge plate, wherein the stopping feature is offset axial from the full diameter region to engage the complementary stopping feature.

17. The hinge of claim 13, wherein said on-axis member includes a full diameter region equal to the diameter of the thru hole in rotational engagement with the thru hole in the second hinge plate, wherein the stopping feature is formed in the full diameter region to engage the complementary stopping feature.

18. An airborne platform comprising:
an aerodynamic body;
a protected element within said aerodynamic body;
a cover, reversibly secured to said aerodynamic body, for protecting said protected element from an external environment;
a releasing mechanism for at least partially detaching said cover from said aerodynamic body; and
a securing assembly for securing said cover to said aerodynamic body, said securing assembly including a hinge for connecting a first end of said cover to a first region of said aerodynamic body, and a releasable element securing a second end of said cover to a second region of said aerodynamic body;
said hinge being configured such that when said second end of said cover separates from said second region of said aerodynamic body when the airborne platform is in flight, a force exerted on said cover rotates the cover about an axis of rotation before detaching said hinge, thereby removing said cover from said aerodynamic body, and
wherein said hinge includes
a recess in the cover with a first thru hole;
a first hinge plate attached to the aerodynamic body;
an on-axis member that extends from the first hinge plate along the axis of rotation aligned with the first thru hole, said on-axis member including a full diameter region equal in diameter to the first thru hole in the cover and a reduced diameter weakened region positioned between the first hinge plate and the full diameter region;
a hard stop including a full diameter region fastened to the end of the full diameter region of the on-axis member and a stopping feature, said full diameter region in rotational engagement with the first thru hole in the cover such that the force rotates the cover around the axis of rotation;
a load transfer interface that couples the full diameter region of the hard stop to the full diameter region of the on-axis member; and
a second hinge plate positioned in the recess and attached to the cover, said second hinge plate having a second thru hole aligned to the first thru hole, said second hinge plate having with a complementary stopping feature configured in the second thru hole to engage the hard stop's stopping feature at a predetermined angle of rotation to transfer a torsional load thru the load transfer interface to shear the on-axis member at the reduced diameter weakened region to detach the hinge and remove the cover from the aerodynamic body leaving the first hinge plate attached to the aerodynamic body.

19. The platform of claim 18, wherein the load transfer interface comprises a plurality of shear pins.

20. The platform of claim 18, wherein detachment of the hinge leaves a small proturbance from the weakened region of the hinge attached to the first hinge plate.

* * * * *

UNITED STATES PATENT AND TRADEMARK OFFICE
CERTIFICATE OF CORRECTION

PATENT NO. : 12,038,040 B2
APPLICATION NO. : 17/348371
DATED : July 16, 2024
INVENTOR(S) : Gald et al.

Page 1 of 1

It is certified that error appears in the above-identified patent and that said Letters Patent is hereby corrected as shown below:

In the Specification

In Column 5, Line 65, after "plate", insert --40--

In Column 7, Line 52, delete "3600" and insert --360°-- therefor

Signed and Sealed this
Eighth Day of April, 2025

Coke Morgan Stewart
*Acting Director of the United States Patent and Trademark Office*